United States Patent [19]

Bender et al.

[11] Patent Number: 5,290,874
[45] Date of Patent: Mar. 1, 1994

[54] ALKADIENE/VINYLAROMATIC COPOLYMERS CONTAINING SIDE GROUPS, AND THEIR USE

[75] Inventors: Dietmar Bender, Schifferstadt; Klaus Bronstert, Carlsberg; Helmut Mach, Heidelberg, all of Fed. Rep. of Germany

[73] Assignee: BASF Aktiengesellschaft, Ludwigshafen, Fed. Rep. of Germany

[21] Appl. No.: 854,386

[22] Filed: Mar. 19, 1992

[30] Foreign Application Priority Data

Mar. 23, 1991 [DE] Fed. Rep. of Germany ....... 4109635

[51] Int. Cl.$^5$ ................. C08F 287/00; C08F 293/00
[52] U.S. Cl. ............................. 525/314; 525/250; 525/271; 525/313; 525/285; 525/282; 525/296; 525/378; 525/379; 525/381; 525/385; 525/940; 525/187
[58] Field of Search ............... 525/250, 271, 313, 314, 525/285, 282, 296, 378, 379, 381, 385, 940, 187

[56] References Cited

U.S. PATENT DOCUMENTS

| | | |
|---|---|---|
| 4,051,050 | 9/1977 | Elliott et al. . |
| 4,145,298 | 3/1979 | Trepka . |
| 4,230,840 | 10/1980 | Katayama et al. ............... 526/77 |
| 4,402,843 | 9/1983 | Trepka . |
| 4,670,173 | 6/1987 | Hayashi et al. . |
| 4,715,975 | 12/1987 | Kapusciniski et al. . |
| 4,735,735 | 4/1988 | Broggrefe et al. . |
| 4,968,754 | 11/1990 | Wong ................................ 525/285 |
| 5,049,294 | 9/1991 | Van Zon et al. .................. 525/285 |
| 5,073,600 | 12/1991 | Gorman et al. ................... 525/285 |

FOREIGN PATENT DOCUMENTS

| | | |
|---|---|---|
| 171167 | 2/1986 | European Pat. Off. . |
| 329254 | 8/1989 | European Pat. Off. . |

OTHER PUBLICATIONS

March, J. "Advanced Organic Chemistry", N.Y., McGraw-Hill, Second Edition, 1977, p. 761.
*Journal of Polymer Science:Polymer Chemistry Edition,* vol. 15 (1977), p. 1527, "Polymers with Reactive End Groups".
Petroleum Additives, Encyclopedia of Polymer Science and Eng. vol. 11, Sec. Ed. (1988) by John Wiley & Sons Inc.
Additive für Schmierstoffe, 235–239 (1978).
Ullmanns Encyclopedia of Chemie, Band 20, pp. 543–548 (1981).

*Primary Examiner*—Vasu S. Jagannathan
*Attorney, Agent, or Firm*—Keil & Weinkauf

[57] ABSTRACT

The novel alkadiene/vinyl-aromatic copolymers which contain side groups and have a random, block-like or star-like structure and whose polymerized alkadiene comonomer units are partially or completely selectively hydrogenated, and which contain one or more side groups having one or more radicals capable of (4+2) cycloaddition (Diels-Alder reaction) with dienophiles are suitable as such as viscosity index (VI) improvers or can be used for the preparation of dispersant VI improvers. For this purpose, they are reacted with one or more dienophiles which are capable of a Diels-Alder (4+2) cycloaddition reaction and preferably contain strongly polar functional groups. The resulting selectively hydrogenated alkadiene/vinylaromatic copolymers having one or more side groups which constitute a (4+2) cycloadduct or a Diels-Alder adduct can be modified in their performance characteristics by further reaction with ammonia, an organic amine, an alkylene oxide, a polyalkylene oxide and/or a condensate of ammonia and/or an organic amine with an alkylene oxide.

12 Claims, No Drawings

ALKADIENE/VINYLAROMATIC COPOLYMERS CONTAINING SIDE GROUPS, AND THEIR USE

The present invention relates to novel alkadiene/vinylaromatic copolymers which contain side groups and have a random, block-like or star-like structure and whose polymerized alkadiene comonomer units are partially or completely selectively hydrogenated, and their use in engine technology and as viscosity index (VI) improvers in mineral oils and lubricating oils, in particular engine oils and gear oils.

For the sake of brevity, the viscosity index (VI) improvers are referred to below as VI improvers.

Certain polymers and copolymers having average molecular weights of from 10,000 to 500,000 g/mol are used as VI improvers in mineral oils and lubricating oils. In this context, reference may be made to Ullmanns Encyklopädie der technischen Chemie, 4th Edition, Volume 20, Schmierstoffe, pages 543 to 548, Weinheim, 1981, or to Encyclopedia of Polymer Science and Engineering, Second Edition, Volume 11, Petroleum Additives, pages 21 to 30, John Wiley and Sons, New York, 1988, which gives a survey of the technical area under discussion here.

In addition to these VI improvers, lubricant formulations customary today contain, as well as a large number of additives, dispersants whose task is to keep in suspension insoluble combustion residues, such as carbon black, coke and resin-like and asphalt-like oxidation products, the amount of which in diesel oil may be up to 10% by weight, and thus to prevent deposits on metal surfaces, thickening of the oil and separation of sludge in the engine. Furthermore, they are intended to neutralize acidic combustion products in order to prevent corrosive wear of the engine parts. In this context, reference may be made to the article by N. J. H. Small in Katalysatoren, Tenside und Mineralöladditive, Editors J. Falbe and U. Hasserodt, G. Thieme Verlag Stuttgart, 1978, pages 235 to 239, which describes the mode of action of dispersants.

Examples of such dispersants are reaction products of alkenylsuccinic anhydrides, in particular polyisobutenylsuccinic anhydrides, with amines or polyamines and other nucleophilic reagents, as described in, for example, Chemical Technology Review No. 207, page 3 et seq., NDC, New Jersey, 1982.

Since these dispersants are necessarily polar compounds or at least contain a sufficient number of polar groups in the molecule, they may have an adverse effect on the performance characteristics of the generally nonpolar VI improvers, for example by reducing the solubility or swellability of the VI improvers in the mineral oil or lubricating oil. However, the additives intended for a certain lubricant formulation must absolutely be compatible with one another, although this cannot be predicted in every case.

It is therefore desirable to combine the properties of dispersants and VI improvers in one polymer or copolymer in order on the one hand to overcome problems of the compatibility of additives and on the other hand to reduce the amount of additives in a lubricant formulation.

VI improvers having a dispersant effect have already been proposed for this purpose (cf. for example Chemical Technology Review No. 207, page 225 et seq., NDC, New Jersey, 1982). Examples of such VI improvers having a dispersant effect are acyl-containing polymers and copolymers of different compositions, which have been reacted with amino-containing reagents (cf. U.S. application 4 735 735 or U.S. application 4 670 173), or with amine-modified homo- and co-polymers (cf. U.S. application 4 715 975 or EP-A-0 171 167).

The common feature of these known VI improvers having a dispersant effect is that the disadvantageous introduction of polar groups frequently leads to a reduction in the solubility in the nonpolar mineral oil or lubricating oil (base oil). It is therefore necessary always to attempt to maintain a balance between the dispersant effect, which in fact is due to the presence of the polar groups, and the oil solubility, which however can only be achieved by processes which permit the introduction of polar functional groups in a controlled manner into VI improvers.

Such processes are disclosed in, for example, U.S. application 4 145 298. Randomly distributed carbanion centers are produced along the polymer main chain with the aid of strong metal bases, as described in, for example, J. Amer. Chem. Soc. 95 (1973), 2376 et seq., or in Tetrahedron Lett. 1963, 1083 et seq., said centers being reacted in a second reaction step with suitable electrophiles, such as ketones, aldehydes, nitriles or epoxides. A disadvantage of this method is that only electrophiles having tertiary amino groups can be used, because secondary or primary amino groups protonate the carbanion centers. However, it is precisely the secondary and primary amino groups which have a substantially better dispersant effect compared with the tertiary ones.

In order to overcome the problem of protonation, alternative electrophilic reagents have been proposed which, after their reaction with the homo- and copolymers, form secondary amino groups as a result of hydrolysis (cf. EP-A-0 329 254). Furthermore, living, anionically polymerized homo- and copolymers can be terminated with amines for this purpose (cf. U.S. application 4 051 050). However, all these processes have limitations with regard to the choice of the reactants and the nature of the suitable electrophiles and polar functional groups.

It is an object of the present invention to provide novel alkadiene/vinylaromatic copolymers which have improved performance characteristics compared with those known to date, contain side groups and have a random, block-like or star-like structure and whose polymerized alkadiene comonomer units are partially or completely selectively hydrogenated and which are either suitable as such as VI improvers or can be used for the preparation of novel VI improvers having a dispersant effect and substantially improved performance characteristics.

It is a further object of the present invention to provide novel processes which permit the preparation of these novel alkadiene/vinylaromatic copolymers containing side groups or of the novel VI improvers in a simple reliable manner.

We have found that these objects are achieved in a surprising manner by the introduction of side groups which are capable of (4+2) cycloaddition (Diels-Alder reaction) with dienophiles into alkadiene/vinylaromatic copolymers which have a random, block-like or star-like structure and whose polymerized alkadiene comonomer units are partially or completely selectively hydrogenated. In view of the prior art, it was not to be expected that the objects of our invention could be achieved elegantly and reliably precisely in this manner, the number of suitable reactants which could be reacted with one another under mild reaction conditions being even more surprising.

Accordingly, the present invention relates to alkadiene/vinylaromatic copolymers which have a random, block-like or star-like structure and whose polymerized alkadiene comonomer units are partially or completely selectively hydrogenated, wherein said copolymers contain one or more side groups having one or more radicals capable of (4+2) cycloaddition (Diels-Alder reaction) with dienophiles.

The present invention furthermore relates to alkadiene/vinylaromatic copolymers of the abovementioned type, which contain one or more side groups having one or more radicals which have been prepared by a Diels-Alder (4+2) cycloaddition reaction of a diene radical with a dienophile.

The present invention also relates to alkadiene/vinylaromatic copolymers of the abovementioned type which contain one or more side groups having one or more radicals which have been prepared by (a) a Diels-Alder (4+2) cycloaddition reaction of a diene radical with one or more dienophiles which contain polar functional groups, and (b) reaction of the resulting Diels-Alder adduct with ammonia, an organic amine, an alkylene oxide, a polyalkylene oxide and/or a condensate of ammonia and/or an organic amine with an alkylene oxide.

The present invention also relates to novel processes for the preparation of these abovementioned novel alkadiene/vinylaromatic copolymers.

By incorporating one or more side groups having one or more radicals, which are capable of (4+2) cycloaddition or a Diels-Alder reaction with dienophiles, into alkadiene/vinylaromatic copolymers which have a random, block-like or star-like structure and whose polymerized alkadiene comonomer units are partially or completely selectively hydrogenated, completely new methods for the elegant and reliable preparation of VI improvers, having a dispersant effect, for mineral oils or lubricating oils, in particular engine oils and gear oils, have surprisingly been opened up: in contrast to the known ene reactions, with the aid of which, for example, maleic anhydride is grafted onto, for example, polybutadiene at from 150° to 200° C., the cycloaddition reactions, in particular the Diels-Alder reaction [(4+2) cycloaddition], take place at a sufficient rate at as low as room temperature. Consequently, the reactants and the end products are not subjected to thermal stress. Moreover, the reactivity of less reactive dienophiles can be greatly increased by adding Lewis acids, so that thermal stress can be avoided in these cases too. After the Diels-Alder reaction, any polar functional groups present in the side groups formed can be converted into functional groups having a highly dispersant effect.

For the sake of brevity, the novel alkadiene/vinylaromatic copolymers which contain side groups having one or more radicals capable of a (4+2) cycloaddition (Diels-Alder reaction) with dienophiles are referred to below as novel copolymers I, the alkadiene/vinylaromatic copolymers which contain side groups having one or more radicals prepared by a Diels-Alder (4+2) cycloaddition reaction of a diene radical with a dienophile are referred to below as novel copolymers II and the novel alkadiene/vinylaromatic copolymers which contain side groups having one or more radicals which have been prepared by (a) a Diels-Alder (4+2) cycloaddition reaction of a diene radical with one or more dienophiles containing polar functional groups, and (b) reaction of the resulting Diels-Alder adduct with ammonia, an organic amine, an alkylene oxide, a polyalkylene oxide and/or a condensate of ammonia and/or an organic amine with an alkylene oxide, are referred to below as novel copolymers III.

One essential component of the novel copolymers I, II and III are conventional alkadiene/vinylaromatic copolymers which have a random, block-like or star-like structure and whose polymerized alkadiene comonomer units are partially or completely selectively hydrogenated. Copolymers of this type and their use as VI improvers are known from the prior art stated at the outset. It is known that the copolymers may have a random distribution of the polymerized comonomer units in their polymer main chain or they may have a block-like structure, in which case, in addition to the conventional A-B and A-B-A two-block and three-block copolymers comprising a vinyl-aromatic block B and one or more alkadiene blocks A, complicated primary structures having blocks of further polymerized comonomers C and/or D, for example A-B-C-B-A or A-B-C-D block copolymers, can also be used. Alkadiene/vinylaromatic copolymers having a star-like structure are also suitable. It is known that these are prepared by coupling living homo- or copolymers with suitable multifunctional compounds. There are virtually no limits to the variety of their structures; the most well-known star-like alkadiene/vinylaromatic copolymers, however, generally have structures such as $A_x$—X, $(A-B)_x$—Z, $(A-B)_w$—Z—$(B)_v$ and $(A-B)_w$—Z—$(A)_v$, where Z is the radical of a bifunctional or polyfunctional coupling reagent, B is a vinylaromatic block, A is an alkadiene block, x is an integer $\geq 2$ and v and w independently of one another are each an integer $\geq 1$. In all block copolymers of the abovementioned type, the transition between the vinyl-aromatic blocks B and the alkadiene blocks A may be well defined or the block B may exhibit a gradual transition into the block A, which is also referred to as a taper.

Examples of suitable alkadienes are conjugated alkadienes, such as 1,3-butadiene, isoprene and 2,3-dimethylbutadiene.

Examples of suitable vinylaromatics are styrene, α-methylstyrene and styrenes which are alkylated in the nucleus, such as o-, p- and m-methylstyrene.

Examples of particularly suitable comonomers are butadiene and isoprene on the one hand and styrene on the other hand, the amount of styrene in the alkadiene/vinyl-aromatic copolymer being from 20 to 80, preferably from 25 to 60, % by weight.

The number average molecular weight $\overline{M}_n$ of these conventional alkadiene/vinylaromatic copolymers is in general from 10,000 to 700,000, preferably from 50,000 to 350,000.

The conventional alkadiene/vinylaromatic copolymers can be prepared by the conventional methods of polymer chemistry, as described in, for example, the text book by W. R. Sorenson and T. W. Campbell, Preparative Methods in Polymer Chemistry, 2nd Edition, Wiley New York, 1968. However, they are preferably prepared by anionic polymerization or block copolymerization, because this gives alkadiene/vinylaromatic copolymers having a block-like or star-like structure and very narrow molecular weight distributions.

For the preparation of the novel copolymers I, II and III, those olefinically unsaturated double bonds of the polymerized alkadiene comonomer units which remain in the alkadiene/vinylaromatic copolymers are partially or completely selectively hydrogenated. Examples of suitable catalysts for the hydrogenation are the reaction products of aluminumalkyls and nickel, and cobalt carboxylates and cobalt alcoholates. An example of a particularly suitable catalyst is a mixture of nickel(II) acetylacetonate and triisobutylaluminum. In general, the hydrogenation is carried out at from 25° to 200° C. under a hydrogen pressure of from 5 to 100 bar. Hydrogenation is advantageously continued until more than 95% of the olefinically unsaturated double bonds still present in the alkadiene/vinylaromatic copolymers have been hydrogenated.

The component of the novel copolymers I which is essential according to the invention is the side group having one or more radicals capable of (4+2) cycloaddition (Diels-Alder reaction) with dienophiles. Radicals of this type generally contain two conjugated olefinically unsaturated double bonds in the cis configuration. Examples of suitable radicals of this type which are to be used according to the invention are cyclopentadienyl radicals.

Examples of very particularly suitable cyclopentadienyl radicals to be used according to the invention are those of the general formula Ia, Ib or Ic

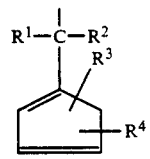

(Ia)

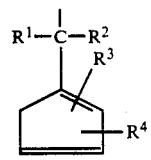

(Ib)

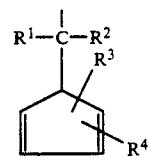

(Ic)

which are bonded either directly or via an aromatic radical of the side group to the polymer main chain(s) of the abovementioned selectively hydrogenated alkadiene/vinylaromatic copolymers.

In the general formulae Ia, Ib and Ic, $R^1$ to $R^4$ may be identical or different and may each be hydrogen, straight-chain or branched, substituted or unsubstituted $C_1$-$C_{22}$-alkyl or alkenyl radicals, straight-chain or branched, substituted or unsubstituted $C_1$-$C_{22}$-alkyl or alkenyl radicals whose carbon chain(s) is or are interrupted by oxygen, N-($C_1$-$C_4$-alkyl) and/or sulfur, substituted or unsubstituted $C_3$-$C_{20}$-cycloalkyl, substituted or unsubstituted $C_6$-$C_{20}$-aryl, substituted or unsubstituted $C_6$-$C_2$-aryl or $C_3$-$C_{20}$-cycloalkyl radicals which furthermore contain one or more of the abovementioned $C_1$-$C_{22}$-alkyl and/or alkenyl radicals, $C_3$-$C_{20}$-cycloalkyl radicals and/or $C_6$-$C_{20}$-aryl radicals, or the abovementioned $C_1$-$C_{22}$-alkyl or alkenyl radicals which furthermore contain one or more of the abovementioned $C_6$-$C_{20}$-aryl and/or $C_3$-$C_{20}$-cycloalkyl radicals. $R^1$ and $R^2$ may also be cyclically bonded to one another as parts of a common ring. Where the above-mentioned alkyl, alkenyl, cycloalkyl and aryl radicals are substituted, the relevant substituents must not contain any CH-acidic functional groups.

Examples of particularly suitable radicals $R^1$ to $R^4$ are hydrogen, methyl, ethyl, n-propyl, isopropyl, n-butyl, but-2-yl, n-pentyl, 3-oxapent-1-yl, 3,6-dioxaoct-1-yl, 3-aza-3-methylpent-1-yl, 3,6-diaza-3,6-dimethyloct-1-yl, 3-thiapent-1-yl, cyclopentyl, cyclohexyl and phenyl.

According to the invention, it is very particularly advantageous if $R^3$ and $R^4$ are each hydrogen and $R^1$ and $R^2$ are each methyl and/or ethyl.

The introduction of the radicals capable of (4+2) cycloaddition or a Diels-Alder reaction with dienophiles into the selectively hydrogenated alkadiene/vinylaromatic polymers, i.e. the preparation of the novel copolymers I, can be carried out by any suitable conventional methods of preparative organic chemistry and polymer chemistry. However, it is very particularly advantageous to prepare the novel copolymers I by metallizing the selectively hydrogenated alkadiene/vinylaromatic copolymers having a random, block-like or star-like structure with organo-alkali metal compounds with formation of the relevant metallized copolymers containing carbanion centers, reacting the metallized copolymers with a fulvene of the general formula II

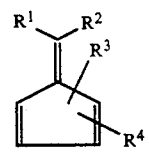

(II)

where $R^1$ to $R^4$ have the meanings stated for the general formulae Ia to Ic, with formation of the relevant copolymer having cyclopentadienyl anions in the side groups, and subjecting this copolymer to protolysis.

According to the invention, it is very particularly advantageous to use 6,6-dialkylfulvenes II, in particular 6,6-dimethylfulvene, 6,6-diethylfulvene or 6-methyl-6-ethylfulvene.

Examples of suitable organs-alkali metal compounds for the metahization are mixtures of organo-lithium compounds with complexing agents or alcoholates of the alkali metals. Examples of suitable organolithium compounds are methyllithium, ethyllithium, propyllithium, n-butyllithium, sec-butyllithium, tert-butyllithium and benzyllithium. Examples of suitable complexing agents are the chelating dismines of the general formula III $$R^5_2N{+}CH_2{)_n}NR^5_2 \quad \text{(III)}$$

where $R^5$ is alkyl and n is an integer $\geq 2$, in particular 2. An example of a particularly suitable chelating diamine is N,N,N',N'-tetramethylethylenediamine. Examples of suitable alcoholates of the alkali metals are potassium sec-butylate and potassium tert-butylate. When the alkali metal alcoholates are used, the molar ratio of alcoholate to organolithium compound is preferably from 0.5 to 2. The complexing agents are preferably used in an excess of from 1 to 50 times.

In general, the metallization is carried out in an inert solvent, in particular in a saturated hydrocarbon, such as hexane, cyclohexane, methylcyclohexane or decalin, under a nitrogen atmosphere at from 0° to 120° C., in particular from 25° to 75° C. The weight ratio of solvent to selectively hydrogenated alkaldiene/vinyl-aromatic copolymer is preferably from 2:1 to 20:1. However, this ratio may vary more widely if it is advantageous for the particular metallization reaction. The amount of organs-alkali metal compound depends on the one hand on the molecular weight of the particular selectively hydrogenated alkadiene/vinylaromatic copolymer used and on the other hand on the desired degree of metallization or substitution. Advantageously, from 4 to 100 equivalents of organs-alkali metal compound are used, so that from 4 to 100 carbanion centers and finally from 4 to 100 side groups are introduced into the polymer main chain(s) at complete conversion. Of course, larger amounts of organs-alkali metal compound may also be used if a higher degree of metallization is desired and/or if it is advantageous for the relevant reaction.

In general, from 0.2 to 10 equivalents of one or more fulvenes II per equivalent of organs-alkali metal compound are used for the reaction of the metallized, selectively hydrogenated alkadiene/vinylaromatic copolymers containing carbanion centers with the fulvenes II. According to the invention, it is advantageous if the ratio of organs-alkali metal compound to fulvene II is from 1:5 to 5:1. However, according to the invention, the use of equimolar amounts is advantageous for process engineering and economic reasons. The reaction can be carried out at from −80° to 180° C. According to the invention, it is advantageous to choose reaction temperatures of from 0° to 80° C.

Subjecting the fulvenes II to an addition reaction with the carbanion centers of the metallized selectively hydrogenated alkadiene/vinylaromatic copolymers results in side groups which contain cyclopentadienyl anions. After the end of the reaction, these anions are protonated in solution with an excess of a protic compound, such as water, an alcohol or an acid. The radicals of the general formulae Ia to Ic which are described in detail above are thus formed from the cyclopentadienyl anions.

Surprisingly, the novel copolymers I can be prepared in yields of more than 80%, based on equimolar amounts of the fulvenes II used. Furthermore, secondary reactions occur to only a small extent, if at all. The preparation of the novel copolymers I by the novel procedure therefore leads to particularly advantageous products having excellent performance characteristics.

The novel copolymers I, in particular those prepared by the procedure according to the invention, are excellent VI improvers for mineral oils and lubricating oils, in particular engine oils and gear oils. However, they are used in particular for the preparation of novel dispersant VI improvers, the novel copolymers II and III.

The novel copolymers II contain one or more side groups having one or more radicals which have been prepared by a Diels-Alder (4+2) cycloaddition reaction of one of the diene radicals described in detail above with one or more dienophiles.

Although the novel copolymers II can be prepared by any methods of polymer chemistry, it is advisable to prepare them by reacting the novel copolymers I described in detail above with dienophiles, the relevant (4+2) cycloadducts or the Diels-Alder adducts being formed in the side groups.

In principle, all dienophiles which are capable of undergoing (4+2) cycloaddition reactions or the Diels-Alder reaction are suitable for the preparation of the novel copolymers II by the procedure according to the invention. The dienophiles having a small number of electrons, in particular the olefinically and acetylenically unsaturated dienophiles, are particularly advantageous according to the invention. Further advantages are obtained if the dienophiles contain strongly polar functional groups. Polar functional groups such as acid groups, functional groups donating acid groups, or keto or aldehyde groups are particularly advantageous, acid groups, in particular carboxyl groups, and functional groups donating acid groups, in particular carboxylic anhydride, carbonyl chloride or carboxylate groups, being very particularly advantageous according to the invention and therefore being very particularly preferred.

Examples of dienophiles which are suitable according to the invention are

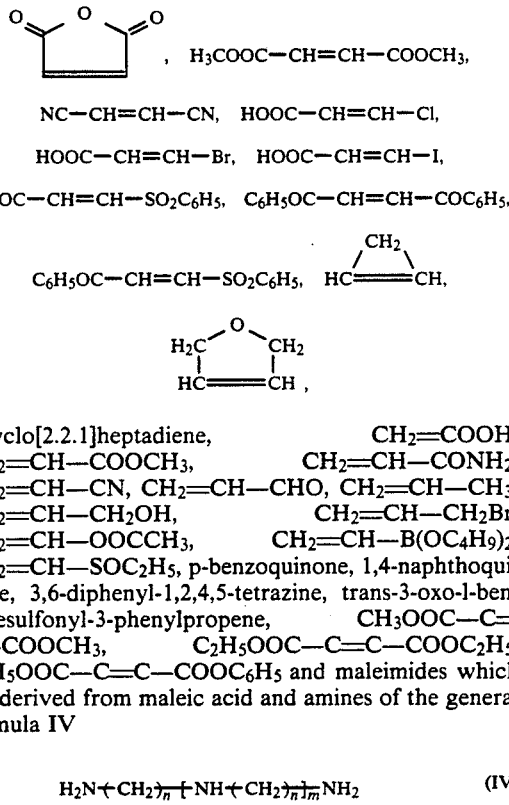

bicyclo[2.2.1]heptadiene, $CH_2=COOH$, $CH_2=CH-COOCH_3$, $CH_2=CH-CONH_2$, $CH_2=CH-CN$, $CH_2=CH-CHO$, $CH_2=CH-CH_3$, $CH_2=CH-CH_2OH$, $CH_2=CH-CH_2Br$, $CH_2=CH-OOCCH_3$, $CH_2=CH-B(OC_4H_9)_2$, $CH_2=CH-SOC_2H_5$, p-benzoquinone, 1,4-naphthoquinone, 3,6-diphenyl-1,2,4,5-tetrazine, trans-3-oxo-1-benzenesulfonyl-3-phenylpropene, $CH_3OOC-C\equiv C-COOCH_3$, $C_2H_5OOC-C\equiv C-COOC_2H_5$, $C_6H_5OOC-C\equiv C-COOC_6H_5$ and maleimides which are derived from maleic acid and amines of the general formula IV $$H_2N+CH_2\frac{}{n}+NH+CH_2\frac{}{n}\frac{}{m}NH_2 \quad (IV)$$

where n is an integer $\geq 2$ and m is 0 or an integer $\geq 1$.

Among these, maleic anhydride, benzoquinone, acrylamide, dimethyl acetylene dicarboxylate and the maleimides which are derived from maleic acid and the amines IV are particularly advantageous according to the invention and are therefore particularly preferably used. Among these in turn, maleic anhydride is very particularly advantageous according to the invention.

According to the invention, it is advantageous to react the dienophiles at from 0° to 200° C., preferably in an inert solvent, such as an aromatic or aliphatic hydrocarbon, in particular cyclohexane or toluene, with the novel copolymers I to give the novel copolymers II. From 1 to 10 equivalents of the dienophile are advantageously used for each radical capable of a (4+2) cycloaddition or Diels-Alder reaction, in particular for each radical Ia to Ic. Since the (4+2) cycloaddition reaction is a stoichiometric 1:1 reaction, the excess of the dienophile serves merely to accelerate the reaction and to ensure complete conversion of all diene radicals. If less reactive dienophiles are used, their reactivity can be greatly increased by adding Lewis acids, such as zinc chloride, to the reaction medium.

The novel copolymers II, in particular those prepared by the procedure according to the invention, have particular advantages. For example, they are excellent dispersant VI improvers in mineral oils and lubricating oils, in particular engine oils and gear oils. When performing this function, they make the use of special dispersants obsolete. They are also used for the preparation of the novel copolymers III.

The novel copolymers III can be prepared by any methods of polymer chemistry and of preparative organic chemistry. According to the invention, however, it is advantageous to prepare them by the novel procedure from the novel copolymers II which contain the abovementioned strongly polar functional groups, by further polymer-analogous reactions with suitable compounds. The choice of the compounds suitable according to the invention for the further polymer-analogous reaction depends on the one hand on which further polar functional groups having a dispersant effect are to be incorporated in the novel copolymers II or are to be present in the novel copolymers III; on the other hand, the choice depends on the strongly polar functional groups in the side groups of the novel copolymers II which are to be reacted. The choice can therefore easily be made by the skilled worker. He can, for example, convert imino groups present in the side groups of the novel copolymers II into primary or secondary amino groups by further polymer-analogous reactions. Furthermore, he can convert carboxyl groups present in the novel copolymers II into amide or imide structures by reaction with suitable amines. He can also convert ester groups present in the novel copolymers II into amide groups with the aid of suitable compounds. If keto or aldehyde groups are present in the side groups of the novel copolymers II, these may be converted into imino groups by reaction with suitable amines.

Examples of suitable compounds for the preparation, according to the invention, of the novel copolymers III from the novel copolymers II are ammonia, amines of the general formula IV which are described in detail above, alkylene oxides, such as ethylene oxide and propylene oxide, and condensates of ammonia and organic amines with alkylene oxides, in particular with ethylene oxide and/or propylene oxide, of the general formulae V, VI and VII $$R^5NQ_2 \qquad (V)$$

$$NQ_3 \qquad (VI)$$

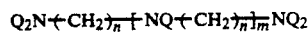  (VII)

where $R^5$ has the meanings stated for the general formula III, n and m have the meanings stated for the general formula IV and Q is hydrogen, 2-hydroxyeth-1-yl or 2-hydroxyprop-1-yl.

Examples of suitable compounds V, VI and VII to be used according to the invention are HO—CH$_2$—CH$_2$—NH$_2$, (HO—CH$_2$—CH$_2$—)$_2$NH, (HO—CH$_2$—CH$_2$—)$_3$N, CH$_3$—NH—CH$_2$—CH$_2$OH, CH$_3$—CH$_2$—NH—CH$_2$—CH$_2$—OH, CH$_3$—CH$_2$—CH$_2$—NH—CH$_2$—CH$_2$—OH, H$_2$N(—CH$_2$—)$_6$NH—CH$_2$—CH$_2$—OH, (HO—CH$_2$—CH$_2$)$_2$N(—CH$_2$—)$_6$NH—CH$_2$—CH$_2$OH and

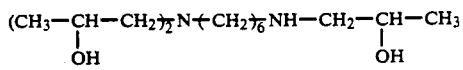

Other examples of suitable compounds for the preparation of the novel copolymers III from the novel copolymers II are polyalkylene oxides, in particular polyethylene oxide and polypropylene oxide.

For the preparation of the novel copolymers III, one or more of the abovementioned suitable compounds and the novel copolymer II are heated together in an inert solvent, advantageously in an aromatic or aliphatic hydrocarbon, for several hours. If necessary, low molecular weight condensates, such as water, can be removed by distillation from the reaction mixture. The reaction temperatures and the reaction times may differ very greatly and are adapted to the particular reactivity of the starting components. According to the invention, it is advantageous to use temperatures of from 0° to 120° C. and reaction times of from 5 min to 8 hours. In order to achieve complete conversion, the abovementioned suitable compounds are used in an excess of from 2 to 10 times, based on the relevant reactive centers in the particular novel copolymer II. After the reactions, the excess suitable compounds are separated off from the novel copolymer III by conventional and known separation methods.

According to the invention, it is particularly advantageous first to react the novel copolymers II with the amines described above or with ammonia and then to react the product with one or more alkylene oxides to give the novel copolymers III.

The novel copolymers III, in particular those prepared by the procedure according to the invention, are excellent VI improvers for mineral oils and lubricating oils, in particular engine oils and gear oils, and have an excellent dispersant effect in this application.

Engines and gears which are lubricated with engine oils or gear oils which contain the novel copolymers I, II and/or III have a substantially lower lubricant consumption, substantially longer intervals between maintenance and a substantially longer service life than engines and gears which are lubricated with conventional lubricants.

In addition, the novel copolymers I, II and III are obtainable in a simple and elegant manner by the single-vessel process according to the invention, i.e. the polymerization, in particular the anionic polymerization, with formation of the block-like or star-like alkadiene/vinylaromatic copolymer, the selective hydrogenation of the alkadiene/vinyl-aromatic copolymer, metallization thereof and the reaction with electrophilic compounds, such as the fulvenes II, with formation of the novel copolymers I, the reaction of the novel copolymers I with dienophiles with formation of the novel copolymers II and their reaction with suitable compounds to give the novel copolymers III can be carried out as a single-vessel reaction in one and the same reaction vessel. This further increases the great attractiveness of the novel copolymers I, II and III, which, owing to their advantageous performance characteristics, are in any case very attractive.

EXAMPLES

In the Examples below, the molecular weights of the alkadiene/vinylaromatic copolymers were determined by gel permeation chromatography. The substances used for calibration of the columns filled with Ultrastyragel 500, 1000 and 10000 were polystyrenes of different molecular weights. The mobile phase was tetrahydrofuran. A GPC software system from Polymer Standards (Mainz, FRG) was used for calculating the number average molecular weights $\overline{M}_n$.

The double bond content of the alkadiene/vinylaromatic copolymers was determined in a conventional manner by iodometric titration.

The kinematic viscosity (mm$^2$/s, formerly cSt) was measured in a conventional manner on 1.5% strength solutions in the base oil SN 200 in a capillary viscometer.

The shear stability index SSI and the shear loss were determined according to DIN 51,382 by viscosity measurements on 1.5% strength solutions in the base oil SN 200 before and after 30 passes through a diesel injection nozzle.

The viscosity index was determined from the temperature/viscosity function of the said 1.5% strength solutions in a conventional manner.

To evaluate the dispersant effect of the polymers, the spot test as described by, for example, A. Schilling in Les Huiles pour Moteurs et le Graissage des Moteurs, Volume 1, page 84 et seq., 1962, was used. For this purpose, solutions of the novel copolymers I, II and III in unblended base oils were prepared, and 5% by weight of an oil which had been laden with carbon black and other combustion residues in an engine test were added to these solutions. To test the effect of water, 1% by weight of water was added. The temperature dependence of the dispersant effect of the novel copolymers I, II and III was tested after heating for 10 minutes at 250° C. For the purpose of the test itself, the oils were applied to a fleece paper (filter paper) and developed for 24 hours in the same way as a chromatogram. Thereafter, the development radii of pure mobile phase (oil) and distributed carbon black were compared, and these radii were expressed as a ratio in percent.

The following starting compounds were prepared for Examples 1 to 19 below:

1. 6,6-Dimethylfulene

Preparation Method 200 ml of a 20% strength solution of potassium hydroxide in ethanol were added dropwise to 660 g of freshly distilled cyclopentadiene and 580 g of acetone in a 4 l three-necked flask at 5° C. After the end of the addition, the resulting reaction mixture was stirred for 24 hours at 0° C. Thereafter, the reaction mixture was extracted with water, after which the resulting organic phase was dried and subjected to fractional distillation. 690 g of a yellow-orange liquid, which crystallized out in a refrigerator, were obtained at a distillation temperature of from 45° to 48° C. and at from 7 to 8 mbar.

2. Isoprene/Styrene Block Copolymer

Preparation Method 5, 000 ml of cyclohexane and 1 ml of 1,1-diphenylethylene were initially taken in a thermostated 10 l reaction vessel which was flushed with a solution of n-butyllithium in cyclohexane under pure nitrogen and which was provided with a stirrer and a thermometer. A 0.2 molar solution of sec-butyllithium in hexane was added to this solution at 30° C. using an injection syringe and with thorough stirring until a permanent pale yellow color formed. 10 mmol of sec-butyllithium and 750 g of isoprene were then added. The temperature increased and was kept at 60° C. by cooling. The resulting reaction mixture was stirred for 1 hour at 60° C. and then heated for a further hour at 70° C. After the rapid addition of 250 g of styrene, the solution was stirred for a further 30 minutes at 60° C. The living block copolymer was then deactivated with 0.5 ml of water. For its characterization, a sample was taken and precipitated in ethanol. The measurements by gel permeation chromatography gave a molecular weight of $1.6 \times 10^5$ g/mol, which corresponded to a number average molecular weight $\overline{M}_n$ of $10^5$ g/Mol. The dispersity $\overline{M}_w/\overline{M}_n$ was 1.07.

3. Butadiene/Styrene Block Copolymer Having a 1,2 Content of 57% and a Styrene Content of 25%

Preparation Method 5,000 ml of cyclohexane, 26 ml of tetrahydrofuran and 250 g of styrene were initially taken in a thermostated 10 l reaction vessel which was flushed with a solution of n-butyllithium in cyclohexane under pure nitrogen and which was equipped with a stirrer and a thermometer. A 0.2 molar solution of sec-butyllithium in hexane was added to this solution at 50° C. using an injection syringe and with thorough stirring until a permanent pale yellow color formed. 10 ml of a 1N solution of sec-butyllithium in cyclohexane were then added. The temperature of the reaction mixture increased to 75° C. The reaction mixture was stirred at this temperature for one hour and cooled to 30° C., after which 1,150 ml (750 g) of butadiene were added. The temperature of the resulting reaction mixture was allowed to increase to 50° C., after which the mixture was heated at 60° C. for one hour. After a further hour at 60° C., the resulting living butadiene/styrene block copolymer was deactivated with 0.5 ml of water. The measurements by gel permeation chromatography gave a molecular weight of $1.5 \times 10^5$ g/mol, which corresponded to a number average molecular weight $\overline{M}_n$ of $1.03 \times 10^5$ g/mol.

4. Random Butadiene/Styrene Copolymer

Preparation Method 7.7 l of cyclohexane, 20 ml of tetrahydrofuran, 80 g of butadiene and 520 g of styrene were initially taken under nitrogen in a 12 l steel kettle and were titrated at 30° C. with 5 mmol of sec-butyllithium until a pale red color appeared. A check was carried out using a titration probe. 10 ml of a 1N solution of secbutyllithium in hexane were then added. The temperature of the reaction mixture then increased sharply and reached a maximum of 123° C. after 10 minutes. The reaction mixture was then cooled to 60° C., and 4 ml of water were added for the purpose of deactivation. The resulting random butadiene/styrene copolymer had a molecular weight $\overline{M}_n$ of $1.65 \times 10^5$ g/mol determined by GPC, which corresponded to a number average molecular weight $\overline{M}_n$ of $1.1 \times 10^5$ g/mol.

5. The Selectively Hydrogenated Isoprene/Styrene and Butadiene/Styrene Block Copolymers and the Selectively Hydrogenated Random Butadiene/Styrene Copolymer

General Preparation Method

The hydrogenation was carried out after transfer of the relevant polymer solutions to a 12 l hydrogenation kettle with 1.48 g of nickel(II) acetylacetonate and 34 ml of triisobutylaluminum (20% strength by weight in hexane) at a hydrogen pressure of 20 bar and at from 85° to 130° C. In the initial phase, the reactions took place very rapidly, which was evident from the steep temperature increase to 90°-130° C. Thereafter, the rate of the hydrogenation reactions decreased substantially. After from 10 to 24 hours, double bond contents of less than 5% were reached, after which the hydrogenation reactions were terminated. The hydrogen atmosphere was displaced, after which the metal catalysts were oxidized by adding in each case 9 g of 30% strength hydrogen peroxide, 100 ml of water and 5 ml of acetic acid. After the oxidized catalysts had been separated off, the selectively hydrogenated block copolymers and the selectively hydrogenated random copolymer were precipitated with ethanol.

EXAMPLES 1 TO 3

The Preparation of the Novel Copolymers I

General Preparation Method

The selectively hydrogenated isoprene/styrene block copolymer described above was used for Example 1, the selectively hydrogenated butadiene/styrene block copolymer described above was used for Example 2 and the selectively hydrogenated random butadiene/styrene copolymer described above was used for Example 3.

500 g of each of these polymers were dissolved under nitrogen in 5 l of cyclohexane, and 0.5 g of 1,1-diphenylethylene was added. The resulting reaction mixture was titrated with a 1N solution of n-butyllithium in hexane until a pale yellow color was obtained. Immediately thereafter, 50 mmol of n-butyllithium, as a 1N solution in hexane, and 5.7 g (50 mmol) of potassium tert-butoxide were added. The resulting reaction mixture was heated for 2 hours at 70° C. with thorough stirring, the color of the particular reaction mixture changing from pale yellow to dark red. Thereafter, the reaction mixtures were cooled to 40° C. and 8 g (60 mmol) of 6,6-dimethylfulvene were added to each of them. The color of the reaction mixtures changed from dark red to yellow. The reaction mixtures were stirred for a further hour, after which the novel copolymers I were precipitated in methanol and dried at 50° C. under reduced pressure.

The novel copolymers I of Examples 1 to 3 prepared in this manner were very good VI improvers for mineral oils and lubricating oils, in particular engine oils and gear oils. They were also very suitable for the preparation of the novel copolymers II.

EXAMPLES 4 TO 6

The Preparation of the Novel Copolymers II

General Preparation Method

The novel copolymer I of Example 1 was used for the preparation of the novel copolymer II of Example 4, the novel copolymer I of Example 2 was used for the preparation of the novel copolymer II of Example 5 and the novel copolymer I of Example 3 was used for the preparation of the novel copolymer II of Example 6.

500 g of each of the novel copolymers I were dissolved in 2 l of toluene, 24.5 g of maleic anhydride were added and refluxing was carried out for 2 hours. The relevant reaction mixtures were then allowed to cool, after which the particular resulting novel copolymers II were each precipitated in 8 l of ethanol and dried at 50° C. under reduced pressure.

The novel copolymers II of Examples 4 to 6 were very good to excellent VI improvers for mineral oils and lubricating oils, in particular engine oils and gear oils. They had a fully satisfactory to good dispersant effect. In particular, they were very suitable for the preparation of the novel copolymers III.

EXAMPLES 7 TO 9

The Preparation of the Novel Copolymers III

General Preparation Method

The novel copolymer II of Example 4 was used for the preparation of the novel copolymer III of Example 7, the novel copolymer II of Example 5 was used for the novel copolymer III of Example 8 and the novel copolymer II of Example 6 was used for the novel copolymer III of Example 9.

100 g of each of the novel copolymers II of Examples 4 to 6 were each dissolved in 0.5 l of toluene, 100 mmol of triethylenetetramine were added and the mixture was heated for 8 hours at 100° C. Thereafter, the resulting novel copolymers III were each precipitated in 3 l of ethanol, dried, each dissolved again in 0.5 l of toluene and then precipitated again from ethanol. After the novel copolymers III had been dried, their performance characteristics were investigated as described above. The results obtained are summarized in the Table.

EXAMPLES 10 TO 12

The Preparation of the Novel Copolymers III

General Preparation Method

The novel copolymer II of Example 4 was used for the preparation of the novel copolymer III of Example 10, the novel copolymer II of Example 5 was used for the preparation of the novel copolymer III of Example 11 and the novel copolymer II of Example 6 was used for the preparation of the novel copolymer III of Example 12.

Examples 7 to 9 were repeated, except that triethanolamine was used instead of triethylenetetramine.

The performance characteristics of the resulting novel copolymers III were determined as described above, and the results obtained are likewise summarized in the Table.

EXAMPLES 13 TO 15

The Preparation of the Novel Copolymers III

General Preparation Method

The novel copolymer II of Example 4 was used for the preparation of the novel copolymer of Example 13, the novel copolymer II of Example 5 was used for the preparation of the novel copolymer III of Example 14 and the novel copolymer II of Example 6 was used for the preparation of the novel copolymer III of Example 15.

Examples 7 to 9 were repeated, except that diethanolamine was used instead of triethylenetetramine.

The performance characteristics of the resulting novel copolymers III were determined as described above, and the results obtained are likewise summarized in the Table.

EXAMPLES 16 TO 18

The Preparation of the Novel Copolymers III

General Preparation Method

The novel copolymer II of Example 4 was used for the preparation of the novel copolymer of Example 16, the novel copolymer II of Example 5 was used f or the preparation of the novel copolymer III of Example 17 and the novel copolymer II of Example 6 was used for the preparation of the novel copolymer III of Example 18.

Examples 7 to 9 were repeated, except that ethanolamine was used instead of triethylenetetramine.

The performance characteristics of the resulting novel copolymers III were likewise determined as described above. The values obtained are likewise shown in the Table.

EXAMPLE 19

The Preparation of a Novel Copolymer III in a Single-Vessel Reaction

Preparation Method 5 l of decalin, 26 ml of tetrahydrofuran and 250 g of styrene were initially taken in a thermostated 10 l steel reactor flushed with a solution of n-butyl-lithium in decalin under pure nitrogen and provided with a stirrer and a thermometer. A 0.2 molar solution of sec-butyllithium was added to the solution at 50° C. using an injection syringe and with thorough stirring until the resulting solution had a permanent pale yellow color. 10 ml of a 1N solution of sec-butyllithium in hexane were then added. The resulting reaction mixture was stirred for 1 hour at 50° C. and then cooled to 30° C. At this temperature, 1,150 ml (750 g) of butadiene were added. The temperature of the resulting reaction mixture was then allowed to increase to 50° C. The reaction mixture was left for 1 hour at this temperature and then heated to 60° C. 0.3 g of water as a 5% strength by weight solution in tetrahydrofuran was then added. The resulting reaction mixture was stirred for a further 5 minutes, after which 0.148 g of nickel(II) acetylacetonate and 3.4 ml of triisobutylaluminum (20% strength by weight in hexane) were added and hydrogen was forced in at a pressure of 20 bar. The reaction mixture was then stirred for 24 hours at 95° C. After this time, a residual double bond content of less than 5% had been reached. The hydrogen was then discharged and was replaced by a nitrogen atmosphere. In one and the same reaction vessel, 100 mmol of n-butyllithium as a 1N solution in hexane and 11.4 g (100 mmol) of potassium tert-butoxide were then added and the resulting reaction mixture was heated for 2 hours at 70° C. A 3 molar solution of 100 mmol of 6,6-dimethylfulvene in decalin was then added to the reaction mixture at 40° C. with thorough stirring. Stirring was continued for 10 minutes, after which hydrogen chloride was passed in for 10 minutes. The excess hydrogen chloride was then removed under reduced pressure.

Still in one and the same reaction vessel, 29.6 g of maleic anhydride were added to the solution of the novel copolymer I and the mixture was stirred f or 4 hours at 90° C. The excess maleic anhydride was then distilled off at 90° C. under reduced pressure from an oil pump. Still in one and the same reaction vessel, 300 mmol of triethylenetetramine were added to the resulting solution of the novel copolymer II and heating was carried out again for 4 hours at 100° C. After the end of the reaction, the novel copolymer III was precipitated with ethanol.

The performance characteristics of the novel copolymer III obtained in this manner in a single-vessel reaction were determined as described above. The values obtained are likewise shown in the Table.

As is evident from the Table, the novel copolymers III of Examples 7 to 19 were excellent VI improvers in mineral oils and lubricating oils, in particular engine oils and gear oils. They had an excellent dispersant effect.

TABLE

The performance characteristics of the novel copolymers III of the Examples 7 to 19

| Example No. | Molecular weight[1] ($10^5$ g/mol) | Viscosity at 40° C. (mm²/s) | Viscosity at 100° C. (mm²/s) | SSI according to DIN 51382 | Shear loss (%) | Viscosity Index | Dispersant effect Ratio of development radii of oil to carbon black in % a) | b) | c) | d) |
|---|---|---|---|---|---|---|---|---|---|---|
| 7 | 1.51 | 162 | 20.5 | 36 | 25.2 | 148 | 76.4 | 73.1 | 79.4 | 78.4 |
| 8 | 1.46 | 183 | 24.4 | 60 | 42.5 | 165 | 73.4 | 75 | 78.6 | 64.8 |
| 9 | 1.58 | 126 | 18.1 | 55 | 37.3 | 161 | 70.5 | 71 | 72.5 | 67.5 |
| 10 | 1.48 | 166 | 21 | 27 | 20.5 | 150 | 75.2 | 72.5 | 80 | 77.5 |
| 11 | 1.43 | 172 | 23.1 | 52 | 35.8 | 163 | 70.6 | 68.6 | 69.4 | 73.6 |
| 12 | 1.53 | 115 | 16.6 | 55 | 34 | 158 | 72.6 | 74 | 76.4 | 75 |
| 13 | 1.51 | 160 | 20.2 | 38 | 25.2 | 146 | 71.2 | 72.2 | 82.9 | 82.8 |
| 14 | 1.46 | 170 | 22.7 | 54 | 35.7 | 161 | 76.1 | 75.4 | 82 | 76.6 |
| 15 | 1.58 | 121 | 16.2 | 50 | 30.5 | 144 | 71 | 73.2 | 75 | 74 |
| 16 | 1.60 | 182 | 21.4 | 27 | 20 | 140 | 71 | 70.2 | 68.5 | 69 |
| 17 | 1.63 | 148 | 18.6 | 30 | 19.1 | 142 | 67.6 | 69 | 73.2 | 76.9 |
| 18 | 1.70 | 127 | 17.4 | 48 | 33.7 | 151 | 65.5 | 67 | 70.5 | 71 |
| 19 | 1.35 | 169 | 23.9 | 27 | 20 | 172 | 77.5 | 78 | 80.5 | 80 | a) Oil dispersion without water
b) Oil dispersion with 1% by weight of water
c) Oil dispersion without water after heating at 250° C.
d) Oil dispersion with 1% water after heating at 250° C.
[1] determined by gel permeation chromatography

We claim:

1. An alkadiene/vinylaromatic copolymer which has a random, block-like or star-like structure and whose polymerized alkadiene comonomer units are partially or completely selectively hydrogenated, wherein said copolymer contains one or more side groups having one or more radicals which have been prepared by a Diels-Alder (4+2) cycloaddition reaction of a diene radical with a dienophile which contains polar functional groups.

2. All alkadiene/vinylaromatic copolymer which has a random, block-like or star-like structure and whose polymerized alkadiene comonomer units are partially or completely selectively hydrogenated, wherein said copolymer contains one or more side groups having one or more radicals which have been prepared by (a) a Diels-Alder (4+2) cycloaddition reaction of a diene radical with a dienophile which contains polar functional groups and (b) reaction of the resulting (4+2) cycloadduct or Diels-Alder adduct with ammonia, an organic amine, an alkylene oxide, a polyalkylene oxide or a condensate of ammonia or an organic amine with an alkylene oxide.

3. An alkadiene/vinylaromatic copolymer as defined in claim 2, wherein the side group contains one or more cyclopentadienyl radicals.

4. An alkadiene/vinylaromatic copolymer as defined in claim 3, wherein the side group contains one or more cyclopentadienyl radicals which are bonded either directly or via an aromatic radical of the side group to the polymer main chain(s) and are of the formula Ia, Ib or Ic

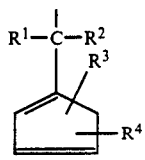

(Ia)

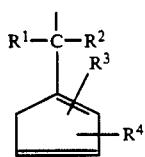

(Ib)

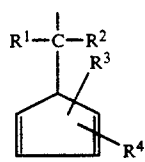

(Ic)

where $R^1$ to $R^4$ May be identical or different and are each hydrogen, a straight-chain or branched, substituted or unsubstituted $C_1$-$C_{22}$-alkyl or alkenyl radical, a straight-chain or branched, substituted or unsubstituted $C_1$-$C_{22}$-alkyl or alkenyl radical whose carbon chain(s) is or are interrupted by oxygen, N-($C_1$-$C_4$-alkyl) or sulfur, substituted or unsubstituted $C_3$-$C_{20}$-cycloalkyl, substituted or unsubstituted $C_6$-$C_{20}$-aryl, a substituted or unsubstituted $C_6$-$C_{20}$-aryl or $C_3$-$C_{20}$-cycloalkyl radical which furthermore contains one or more of the abovementioned $C_1$-$C_{22}$-alkyl or alkenyl radicals, $C_{13}$-$C_{20}$-cycloalkyl or $C_6$-$C_{20}$-aryl, or the abovementioned $C_1$-$C_{22}$-alkyl or alkenyl radicals which furthermore contain one or more of the abovementioned $C_6$-$C_{20}$-aryl or $C_3$-$C_{20}$-cycloalkyl radicals, and $R^1$ and $R^2$ may be cyclically bonded to one another as parts of a common ring and the substituents of the abovementioned substituted alkyl, alkenyl, cycloalkyl, aryl and arylalkyl radicals must not contain any CH-acidic functional groups.

5. An alkadiene/vinylaromatic copolymer as defined in claim 4, wherein $R^1$ and $R^2$ are each methyl or ethyl.

6. An alkadiene/vinylaromatic copolymer as defined in claim 2, wherein the dienophiles contain strongly polar functional groups.

7. An alkadiene/vinylaromatic copolymer as defined in claim 6, wherein the strongly polar functional groups are acid groups, functional groups donating acid groups, or keto or aldehyde groups.

8. An alkadiene/vinylaromatic copolymer as defined in claim 7, wherein the acid groups are carboxyl groups and the functional groups donating acid groups are carboxylic anhydride, carbonyl halide or ester groups.

9. An alkadiene/vinylaromatic copolymer which contains side groups and is prepared by (1) metallizing an alkadiene/vinylaromatic copolymer which has a random, block-like or star-like structure and whose polymerized alkadiene comonomer units are partially or completely selectively hydrogenated, with formation of the relevant metallized copolymer containing carbanion centers, (2) reacting this copolymer with a fulvene of the formula II

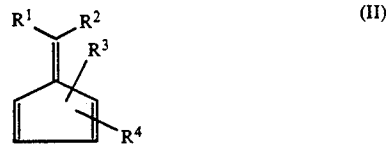

(II)

where $R^1$ to $R^4$ have the meanings stated in claim 4 or 5, with formation of the relevant copolymer having cyclopentadienyl anions in the side groups, and (3) subjecting this copolymer to protolysis.

10. An alkadiene/vinylaromatic copolymer which contains side groups and has a random, block-like or star-like structure, whose polymerized alkaldiene comonomer units are partially or completely selectively hydrogenated and which is prepared by (4) reacting an alkadiene/vinylaromatic copolymer as claimed in claim 9 with a dienophile, with formation of the relevant (4+2) cycloadduct or Diels-Alder adduct.

11. An alkadiene/vinylaromatic copolymer which contains side groups and has a random, block-like or star-like structure, whose polymerized alkadiene comonomer units are partially or completely selectively hydrogenated and which is prepared by (5) reacting an alkadiene/vinylaromatic copolymer as claimed in claim 10 with ammonia, an organic amine, an alkylene oxide, a polyalkylene oxide or a condensate of ammonia or an organic amine with an alkylene oxide.

12. A composition which contains an alkadiene/vinyl-aromatic copolymer as defined in claim 2.

* * * * *

UNITED STATES PATENT AND TRADEMARK OFFICE
CERTIFICATE OF CORRECTION

PATENT NO.: 5,290,874

DATED: March 1, 1994

INVENTOR(S): BENDER et al.

It is certified that error appears in the above-identified patent and that said Letters Patent is hereby corrected as shown below:

Column 17, claim 2, line 6, "All" should be --An--.

Column 18, claim 5, line 8, after "R²" and before "are" insert a space.

Signed and Sealed this

Twentieth Day of September, 1994

Attest:

BRUCE LEHMAN

Attesting Officer

Commissioner of Patents and Trademarks